US012259593B2

(12) United States Patent
Uemura

(10) Patent No.: US 12,259,593 B2
(45) Date of Patent: Mar. 25, 2025

(54) LENS BARREL AND IMAGE PICKUP APPARATUS

(71) Applicant: CANON KABUSHIKI KAISHA, Tokyo (JP)

(72) Inventor: Kohei Uemura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 18/317,256

(22) Filed: May 15, 2023

(65) Prior Publication Data

US 2023/0384553 A1 Nov. 30, 2023

(30) Foreign Application Priority Data

May 24, 2022 (JP) ................................ 2022-084561

(51) Int. Cl.
*G02B 7/02* (2021.01)
*G02B 27/64* (2006.01)
*G03B 5/00* (2021.01)
*H04N 23/54* (2023.01)
*H04N 23/55* (2023.01)
(Continued)

(52) U.S. Cl.
CPC ........... *G02B 7/021* (2013.01); *G02B 27/646* (2013.01); *G03B 5/00* (2013.01); *H04N 23/54* (2023.01); *H04N 23/55* (2023.01); *H04N 23/687* (2023.01); *G02B 7/28* (2013.01); *G03B 2205/0015* (2013.01); *G03B 2205/0046* (2013.01)

(58) Field of Classification Search
CPC .... H04N 23/54; H04N 23/55; H04N 23/6812; H04N 23/687; H04N 23/69; G02B 7/021; G02B 7/102; G02B 7/28; G02B 27/646; G03B 5/00; G03B 17/04; G03B 2205/0015; G03B 2205/0046
See application file for complete search history.

(56) References Cited

U.S. PATENT DOCUMENTS

| 7,619,654 | B2 * | 11/2009 | Ito | H04N 23/68 |
| | | | | 348/208.99 |
| 8,773,762 | B2 * | 7/2014 | Suzuka | G03B 17/04 |
| | | | | 396/350 |
| 2015/0168683 | A1 * | 6/2015 | Terada | G02B 7/14 |
| | | | | 359/817 |

FOREIGN PATENT DOCUMENTS

| JP | 2010-286789 A | 12/2010 |
| JP | 2015-135472 A | 7/2015 |

* cited by examiner

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

A retractable lens barrel includes a moving unit configured to move a first optical member in an optical system between an imaging position located on an optical axis and a shifted position shifted from the optical axis, a base member movably supporting the moving unit, a cylindrical member, and an operating member configured, when operated, to cause relative movement between the cylindrical member and the base member. The cylindrical member includes a sliding surface on which the moving unit slides and an engagement portion. The moving unit slides on the sliding surface and moves the first optical member from the imaging position to the retracted position as the lens barrel transitions from the imaging state to the retracted state. In a case where the lens barrel is in the retracted state, the moving unit is engaged with the engagement portion and restricted from moving.

15 Claims, 12 Drawing Sheets

(51) Int. Cl.
*H04N 23/68* (2023.01)
*G02B 7/28* (2021.01)

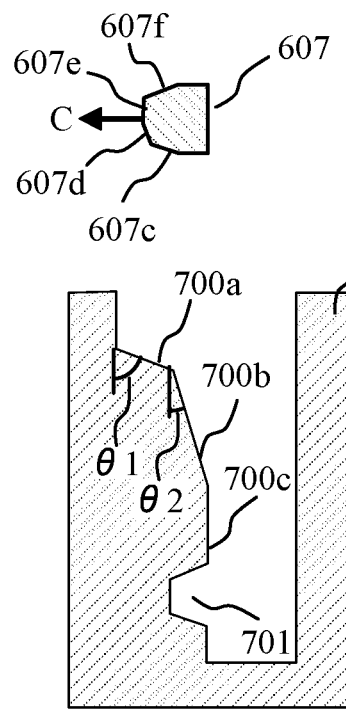
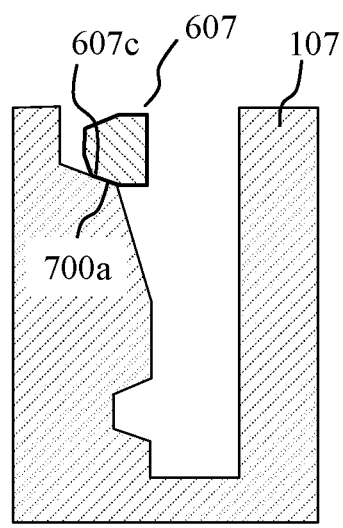
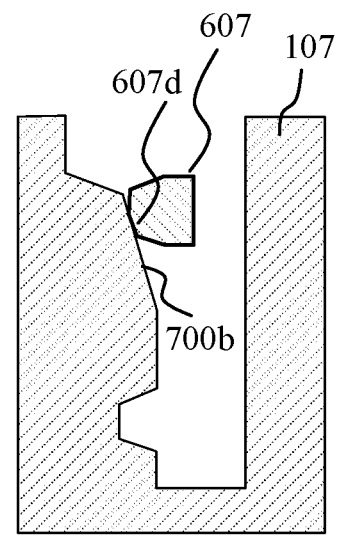
FIG. 8A    FIG. 8B    FIG. 8C
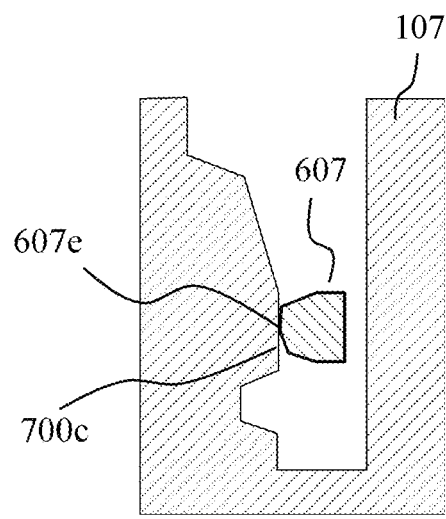
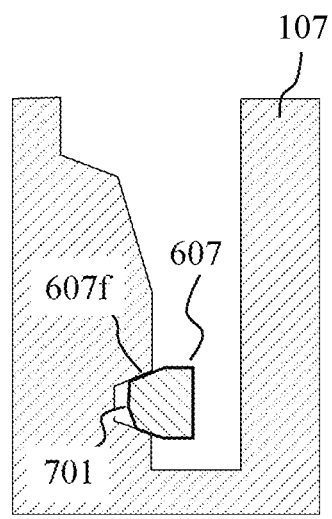
FIG. 8D    FIG. 8E

LENS BARREL AND IMAGE PICKUP APPARATUS

BACKGROUND

Technical Field

One of the aspects of the disclosure relates to a lens apparatus and an image pickup apparatus.

Description of Related Art

In order to reduce the overall length in the optical axis direction, some of the conventional lens barrels include a retractable mechanism that narrows a distance between lens units during transition from an imageable state to a retracted state in which imaging is restricted. Japanese Patent Laid-Open No. ("JP") 2010-286789 discloses a lock mechanism for restricting unintentional transition between the imaging state and the retracted state.

JP 2015-135472 discloses a lens shifting mechanism (lens withdrawing mechanism) that shifts a lens unit in a direction orthogonal to the optical axis in order to further reduce the overall length in the optical axis direction.

In a case where the lock mechanism disclosed in JP 2010-286789 and the lens shifting mechanism disclosed in JP 2015-135472 are mounted on a manually retractable barrel, the lens barrel will become large.

SUMMARY

One of the aspects of the present disclosure provides a lens barrel that includes a lock mechanism for a retracted state and a lens shifting mechanism and can suppress size increase.

A lens barrel according to one aspect of the disclosure is configured to transition between an imaging state where imaging is enabled and a retracted state where imaging is restricted. The lens barrel includes a moving unit configured to move a first optical member included in an optical system between an imaging position located on an optical axis of the optical system and a shifted position shifted from the optical axis, a base member configured to movably support the moving unit, a cylindrical member disposed on an outer circumference of the base member, and an operating member configured, when operated, to cause relative movement between the cylindrical member and the base member. The cylindrical member includes a sliding surface on which the moving unit slides and an engagement portion engageable with the moving unit. The moving unit slides on the sliding surface and moves the first optical member from the imaging position to the retracted position in a case where the lens barrel transitions from the imaging state to the retracted state. In a case where the lens barrel is in the retracted state, the moving unit is engaged with the engagement portion and restricted from moving. An image pickup apparatus having the above lens barrel also constitutes another aspect of the disclosure.

Further features of the disclosure will become apparent from the following description of embodiments with reference to the attached drawings.

BRIEF DESCRIPTION OF THE DRAWINGS

FIGS. 8A to 8E are sectional views taken along a line A-A in FIG. 7.

DESCRIPTION OF THE EMBODIMENTS

Figure 1A:
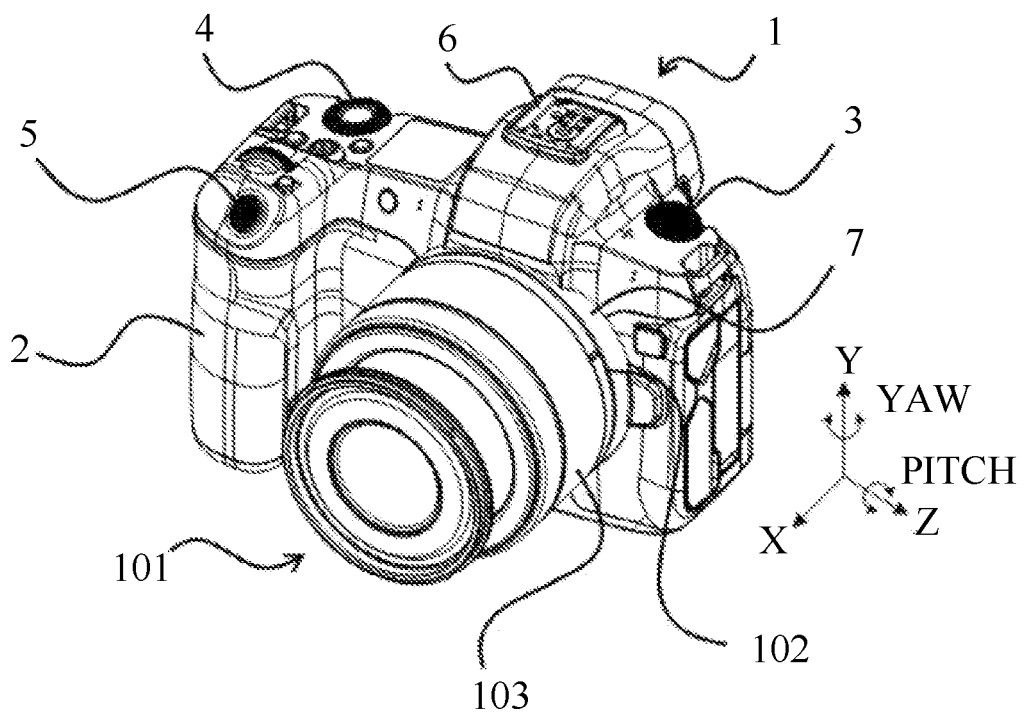
FIGS. 1A and 1B are perspective views of an image pickup apparatus that includes a lens barrel according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

Figure 1B:
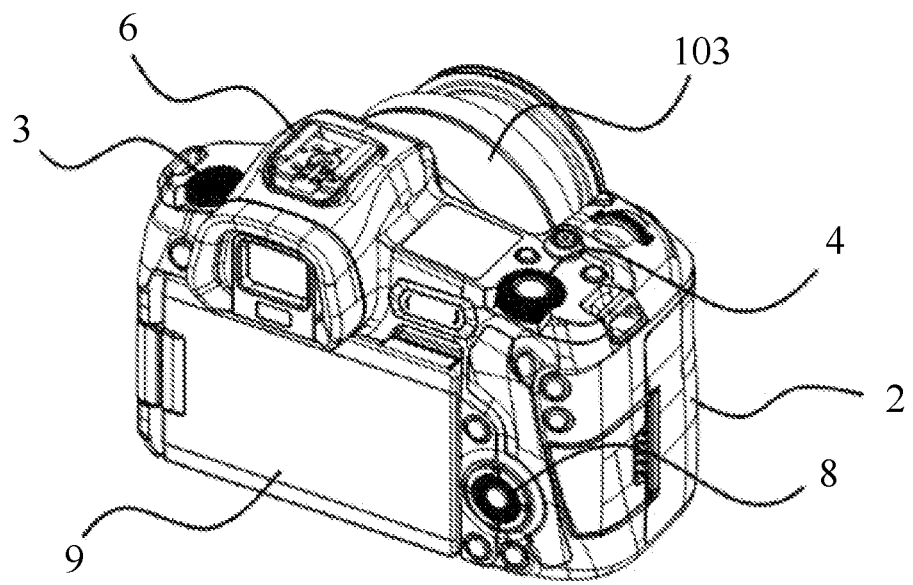

FIGS. 1A and 1B are perspective views of an image pickup apparatus that includes a lens barrel according to one embodiment of the disclosure. FIGS. 1A and 1B are perspective views viewed from a front side (object side) and a rear side (image plane side), respectively. The image pickup apparatus includes a lens barrel 101 and a camera body 1 to which the lens barrel 101 is detachably attached. In this embodiment, as illustrated in FIG. 1A, an X-axis direction is an optical axis direction, which is a direction in which the optical axis of the imaging optical system of the lens barrel 101 extends (a direction along the optical axis). A Z-axis direction (horizontal direction) and a Y-axis direction (vertical direction) are directions orthogonal to the X-axis direction. In the following description, the Z-axis direction and the Y-axis direction are collectively referred to as a Z/Y-axis direction. A rotating direction about the Z-axis is defined as a pitch direction, and a rotating direction about the Y-axis is defined as a yaw direction. The pitch direction and yaw direction (collectively referred to as a pitch/yaw direction hereinafter) are rotating directions about two axes, the Z-axis and the Y-axis, which are orthogonal to each other. In this embodiment, the lens barrel 101 and the camera body 1 are separate components, but they may be integrated with each other.

A grip portion 2 for the user to grip the camera body 1 by hand is provided on the left side of the camera body 1 viewed from the front side (right side viewed from the back side). A power operation unit 3 is disposed on a top surface of the camera body 1. In a case where the user turns on the power operation unit 3 of the camera body 1 in the power off state, the power supply starts and the camera body 1 is powered on, and a computer program such as origin detecting processing of the focus unit is executed, the camera becomes in an imaging standby state. In this embodiment, in a case where the lens barrel 101 is mechanically and electrically connected to the camera body 1 while the camera body 1 is powered off, energization from the camera body 1 to the lens barrel 101 is started and the origin detecting processing of the focus unit is performed. In a case where the user turns off the power operation unit 3 while the camera body 1 is powered on, the camera body 1 becomes powered off.

A mode dial 4, a release button 5, and an accessory shoe 6 are provided on the top surface of the camera body 1. An imaging mode can be switched by the user rotating the mode dial 4. The imaging mode includes a manual still image imaging mode in which the user can arbitrarily set an imaging condition such as a shutter speed and an F-number (aperture value), an automatic still image capturing mode in which a proper exposure amount is automatically obtained, and a moving image capturing mode. Half-pressing the release button 5, the user can instruct an imaging preparation operation such as autofocus (AF) and auto-exposure (AE) control, and fully pressing the release button 5, the user can instruct imaging. An accessory (camera accessory) such as an external flash or lighting unit is detachably attached to the accessory shoe 6.

The lens barrel 101 includes a lens mount 102 that can be mechanically and electrically connected to a camera mount 7 provided on the camera body 1, and an imaging optical system that forms an object image. A zoom operation ring (operation member) 103 is provided on the outer circumference of the lens barrel 101 and is rotatable about the optical axis by user operation. In a case where the user operates the zoom operation ring 103, a zoom unit that constitutes the imaging optical system moves to a position corresponding to an angle of the zoom operation ring 103 in a range from a wide-angle end to a telephoto end. Thereby, the user can capture an image at a desired angle of view. In a case where the zoom unit is located in the range from the wide-angle end to the telephoto end, the lens barrel 101 is in an imaging state in which imaging is enabled. In a case where the zoom operation ring 103 is further operated after the zoom unit reaches the wide-angle end from the telephoto end, the zoom unit reaches a retraction end where imaging is restricted. In a case where the zoom unit is located at the retraction end, the lens barrel 101 is in a retracted state (non-imaging state) in which the imaging optical system is housed and the overall length in the optical axis direction becomes the shortest length. The phrase "imaging is restricted" means that part of the function of the image pickup apparatus does not normally operate. For example, the lens barrel in the retracted state can image an object, but a captured image may be out of focus and at least partially blurred.

A rear operation unit 8 and a display unit 9 are provided on the rear surface of the camera body 1. The rear operation unit 8 includes a plurality of buttons and a dial to which various functions are assigned. In a case where the camera body 1 is in the power-on state and a still image or moving image capturing mode is set, the display unit 9 displays a live-view (through) image of an object image captured by an image sensor, which will be described below. The display unit 9 also displays an imaging parameter indicating an imaging condition such as a shutter speed and an F-number. At this time, the user can change a set value of the imaging parameter by operating the rear operation unit 8 while viewing the display on the display unit 9. The rear operation unit 8 includes a playback button for instructing playback of a recorded captured image. In a case where the user operates the playback button, the captured image is played back and displayed on the display unit 9. The display unit 9 may be of a touch panel type and configured to have the same function as the rear operation unit 8.

Figure 2:
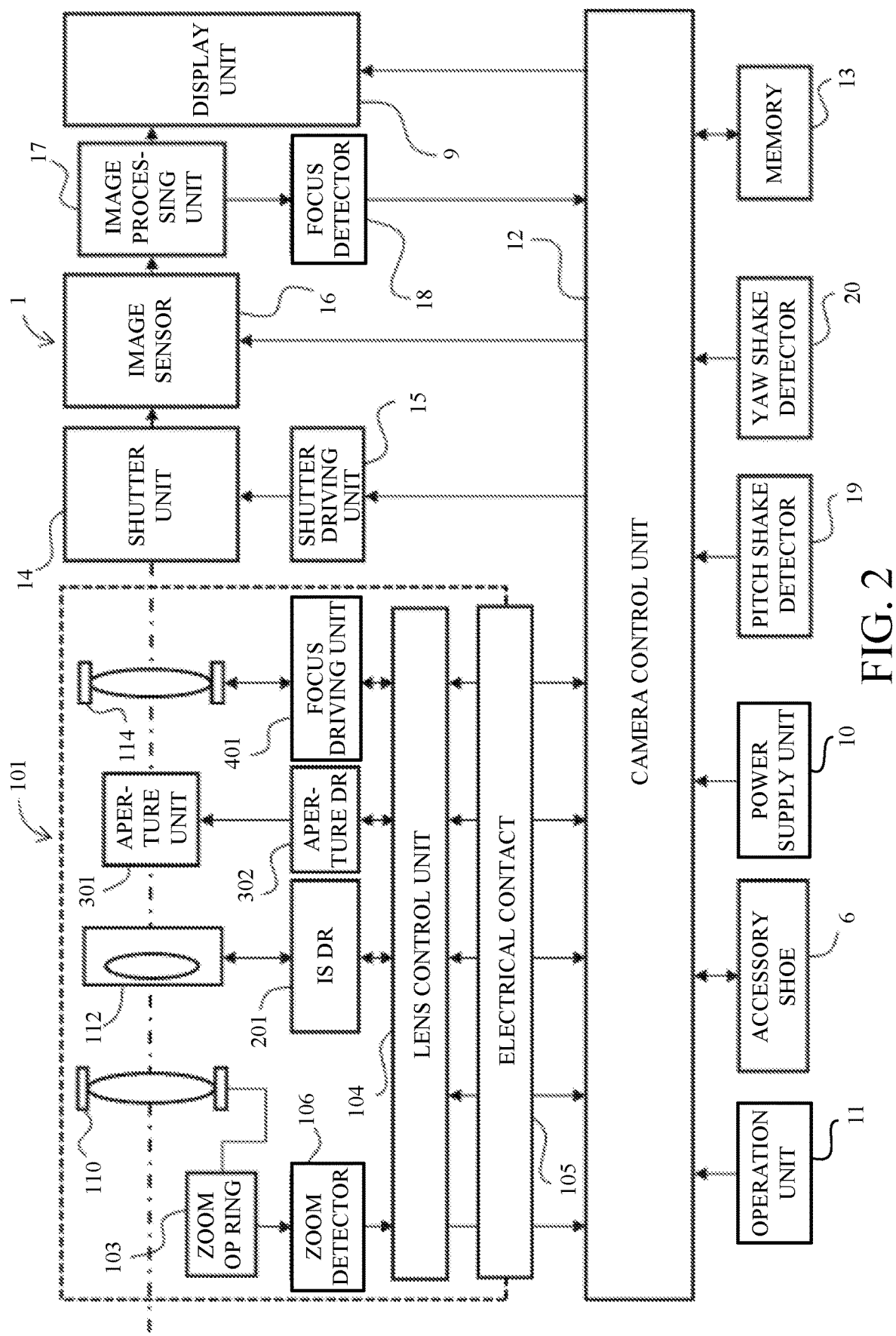
FIG. 2 is a block diagram of the image pickup apparatus.

FIG. 2 is a block diagram illustrating an electrical and optical configuration of the image pickup apparatus. The camera body 1 includes a power supply unit 10 that supplies power to the camera body 1 and the lens barrel 101, the power operation unit 3, the mode dial 4, the release button 5, the rear operation unit 8, and an operation unit 11 including a touch panel function of the display unit 9. The camera body 1 further includes a camera control unit 12, a shutter unit 14, a shutter driving unit 15, an image sensor 16, an image processing unit 17, and a focus detector 18. In this embodiment, the overall control of the image pickup apparatus is performed by the camera control unit 12 and a lens control unit 104 provided in the lens barrel 101 cooperating with each other.

The camera control unit 12 reads and executes a computer program stored in a memory 13. At this time, the camera control unit 12 communicates various control signals, data, etc. with the lens control unit 104 via the communication terminal of an electrical contact 105 provided on the lens mount 102. The electrical contact 105 includes a power terminal for supplying power from the power supply unit 10 to the lens barrel 101.

The shutter unit 14 controls an exposure amount to the image sensor 16. The image sensor 16 photoelectrically converts an object image formed by the imaging optical system and outputs an imaging signal. The image processing unit 17 generates an image signal after performing various image processing for the imaging signal. The display unit 9 displays an image signal (live-view image) output from the image processing unit 17, displays an imaging parameter, and plays back and displays captured images recorded in the memory 13 or an unillustrated recording medium.

The imaging optical system in the lens barrel 101 includes a zoom unit 110 connected to a zoom operation ring 103 and movable along the optical axis to change an angle of view, and an image stabilizing unit (image blur correcting unit) 112 that includes a shift lens (first optical member) 601, which will be described below. The image stabilizing unit 112 reduces image blur by moving (shifting) in the Z/Y-axis directions orthogonal to the optical axis. The imaging optical system further includes an aperture (stop) (diaphragm) unit 301 that performs a light amount adjusting operation, and a focus unit 114 that includes a focus lens that moves in the optical axis direction during focusing. The lens barrel 101 includes an image stabilizing driving unit 201 that moves the image stabilizing unit 112, an aperture driving unit 302 that moves the aperture unit 301, and a focus driving unit 401 that moves the focus unit 114.

The camera control unit 12 controls the focus driving unit 401 in response to an imaging preparation operation performed for the operation unit 11 (such as half-pressing operation of the release button 5). For example, in a case where an AF operation is instructed, the focus detector 18 determines a focus state of an object image on the imaging plane of the image sensor 16 based on an image signal generated by the image processing unit 17, generates a focus signal, and transmits it to the camera control unit 12. The focus driving unit 401 also transmits information about the current position of the focus unit 114 to the camera control unit 12. The camera control unit 12 compares the focus state of the object image with the current position of the focus unit 114, calculates a focus driving amount based on the shift amount, and transmits the focus driving amount to the lens control unit 104. The lens control unit 104 moves the focus unit 114 to a target position in the optical axis direction via the focus driving unit 401 to correct the defocus of the object image.

The focus driving unit 401 includes a focus motor that functions as an actuator and a photo-interrupter that detects the origin position of the focus unit 114. In this embodiment, a stepping motor is used as the focus motor.

A DC motor having an encoder, an ultrasonic motor, a servo motor, or the like may be used as the focus motor. Instead of the photo-interrupter, a photo-reflector or a brush that contacts a conductive pattern to electrically detect a signal may be used to detect the origin position of the focus unit 114.

The camera control unit 12 also controls the aperture unit 301 and the shutter unit 14 via the aperture driving unit 302 and the shutter driving unit 15 according to the set values of the F-number and the shutter speed received from the operation unit 11. For example, in a case where an AE control operation is instructed, the camera control unit 12 receives a luminance signal generated by the image processing unit 17 and performs photometric calculation. The camera control unit 12 controls the aperture driving unit 302 based on the result of the photometry calculation, in response to the imaging instruction operation (such as the full pressing operation of the release button 5) performed for the operation unit 11. The camera control unit 12 controls the shutter unit 14 via the shutter driving unit 15 and performs exposure processing by the image sensor 16.

The camera body 1 includes a pitch shake detector 19 and a yaw shake detector 20. The pitch shake detector 19 and the yaw shake detector 20 detect image shakes in the pitch and yaw directions using an angular velocity sensor (vibration gyro) and an angular acceleration sensor, respectively, and output shake signals. The camera control unit 12 calculates the shift position of the image stabilizing unit 112 in the Y-axis direction using the shake signal from the pitch shake detector 19. The camera control unit 12 calculates the shift position of the image stabilizing unit 112 in the Z-axis direction using the shake signal from the yaw shake detector 20. Then, the camera control unit 12 moves the image stabilizing unit 112 to the target position in the Z/Y-axis direction via the image stabilizing driving unit 201 according to the calculated shift position in the pitch/yaw direction to reduce image blur during live-view image display.

The lens barrel 101 includes a zoom detector 106 that detects an angle of a zoom operation ring 103 for changing an angle of view of the imaging optical system. The zoom detector 106 includes, for example, a resistive linear potentiometer, and detects the angle of the zoom operation ring 103 operated by the user as an absolute value. Information about the angle of view detected by the zoom detector 106 is transmitted to the lens control unit 104 and reflected in various controls by the camera control unit 12.

Figure 3A:
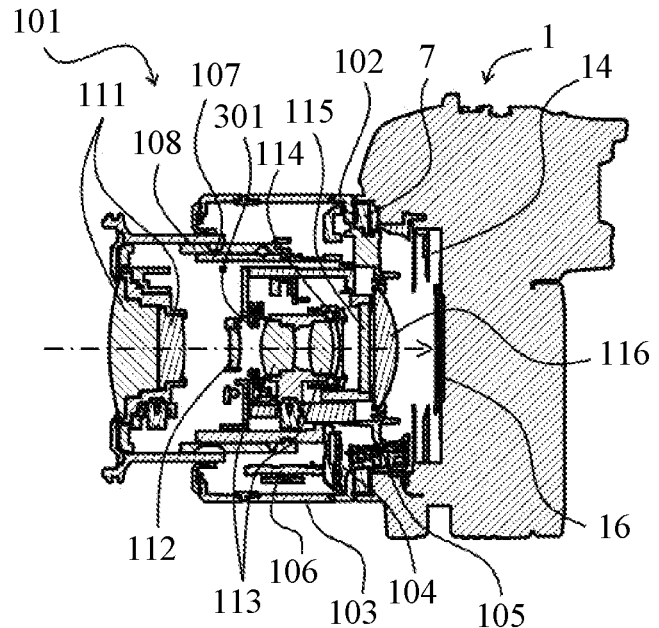
FIGS. 3A to 3C are sectional views of the lens barrel.
Figure 3B:
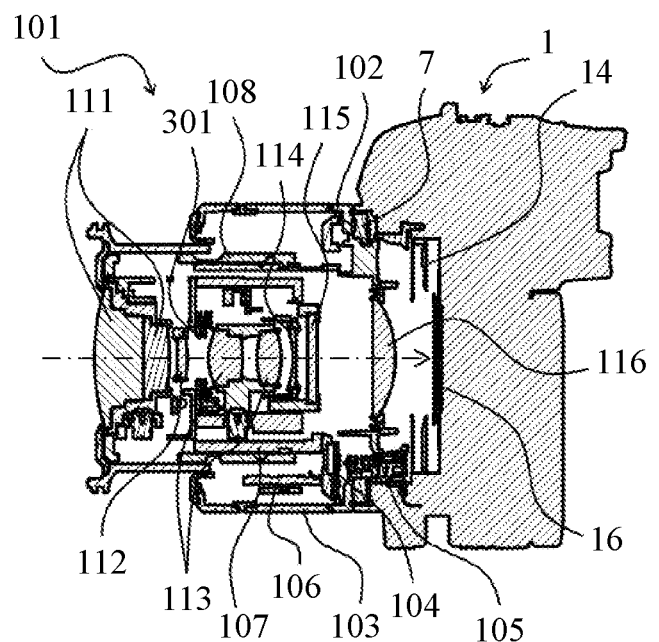
Figure 3C:
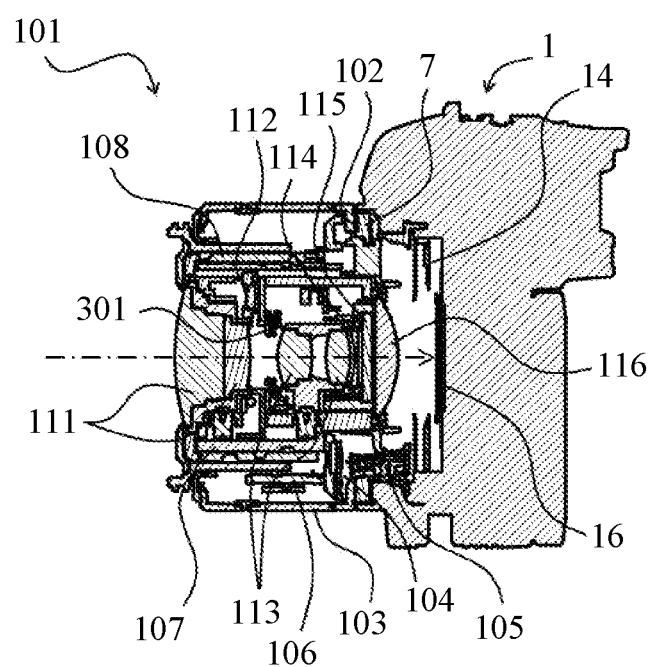

Referring now to FIGS. 3A to 3C, a description will be given of a positional relationship among the main components of the lens barrel 101. FIGS. 3A to 3C are sectional views on the XY plane including the optical axis of the lens barrel 101 in a case where the zoom unit 110 is located at the wide-angle end, the telephoto end, and the retraction end during non-imaging, respectively. Since a centerline illustrated in FIGS. 3A to 3C approximately coincides with the optical axis determined by the imaging optical system, it will be referred to as the optical axis hereinafter.

In this embodiment, a six-unit configuration is adopted as an example of the imaging optical system. The zoom unit 110 moves to different predetermined positions at the wide-angle end and the telephoto end, and forms an object image on the imaging plane of the image sensor 16. The zoom unit 110 includes a first lens unit 111, the image stabilizing unit 112 functioning as a second lens unit, the aperture unit 301, a third lens unit 113, the focus unit 114 functioning as a fourth lens unit, a fifth lens unit 115, and a sixth lens unit 116. The image stabilizing unit 112 and the focus unit 114 may function as other zoom units. Some lens units may not be movable and may be fixed.

A linear guide cylinder (cylinder member) 107 is fixed to the lens mount 102 via an unillustrated fixed cylinder. Unillustrated cam grooves are formed at equally divided positions in the outer circumferential surface of the linear guide cylinder 107. Unillustrated cam followers are provided on the inner circumferential surface of the cam cylinder 108. The cam cylinder 108 is connected to the zoom operation ring 103 via an unillustrated key. In a case where the zoom operation ring 103 is operated, the cam cylinder 108 moves back and forth along the optical axis while rotating about the optical axis due to the engagement between the cam grooves and the cam followers.

The linear guide cylinder 107 has linear guide grooves 702 at equally divided positions. The linear guide grooves 702 restrict the movement of the zoom unit 110 in the rotational direction and guide the linear movement of the zoom unit 110 in the optical axis direction. In the cam cylinder 108, first cam grooves 801 and second cam grooves 802 have loci of different angles in the rotational direction corresponding to the zoom unit 110 and are formed at equally divided positions. The zoom unit 110 includes a plurality of cam followers, and each cam follower is engaged with the corresponding linear guide groove and cam groove. As the zoom operation ring 103 is operated, the cam cylinder 108 rotates, and due to engagements between the cam followers and the linear guide grooves and the cam grooves, the zoom unit 110 is restricted from moving in the rotating direction and moves in the optical axis direction.

In this embodiment, the lens barrel 101 has a retracting mechanism that narrows the distance between the lens units and a shifting mechanism (withdrawing mechanism) for the image stabilizing unit 112. Since the zoom unit 110 can be retracted to the rear side (imaging plane side) during non-imaging, the overall length of the lens barrel 101 can be reduced and the portability of the image pickup apparatus can be enhanced. In a case where the zoom operation ring 103 is operated and the lens barrel 101 transitions from the state illustrated in FIG. 3C to the state illustrated in FIG. 3B, the zoom unit 110 moves forward (object side), and the lens barrel 101 enters an imaging state in which imaging is enabled.

In the states of FIGS. 3A and 3B, all the lens units are arranged on the same optical axis, but in the state of FIG. 3C, the image stabilizing unit 112 has been moved (shifted) in the direction (diameter direction) orthogonal to the optical axis. In a case where the user operates the zoom operation ring 103 to move the lens barrel 101 from the state illustrated in FIG. 3B to the state illustrated in FIG. 3C, the zoom unit 110 starts retracting toward the rear side (imaging plane side), but simultaneously the image stabilizing unit 112 shifts from the optical axis. The first lens unit (second optical member) 111 is retracted (inserted) into the space created by the shift of the image stabilizing unit 112 and accommodated so that they do not interfere with each other. Thereby, the state illustrated in FIG. 3C that provides the shortest overall length is formed.

In this embodiment, the operation of the zoom operation ring 103 for moving the zoom unit 110 from the telephoto end to the retraction end will be referred to as an operation of the zoom operation ring 103 toward the retraction side. The operation of the zoom operation ring 103 for moving the zoom unit 110 from the retraction end to the telephoto end will be referred to as an operation of the zoom operation ring 103 toward the imaging side.

Figure 4:
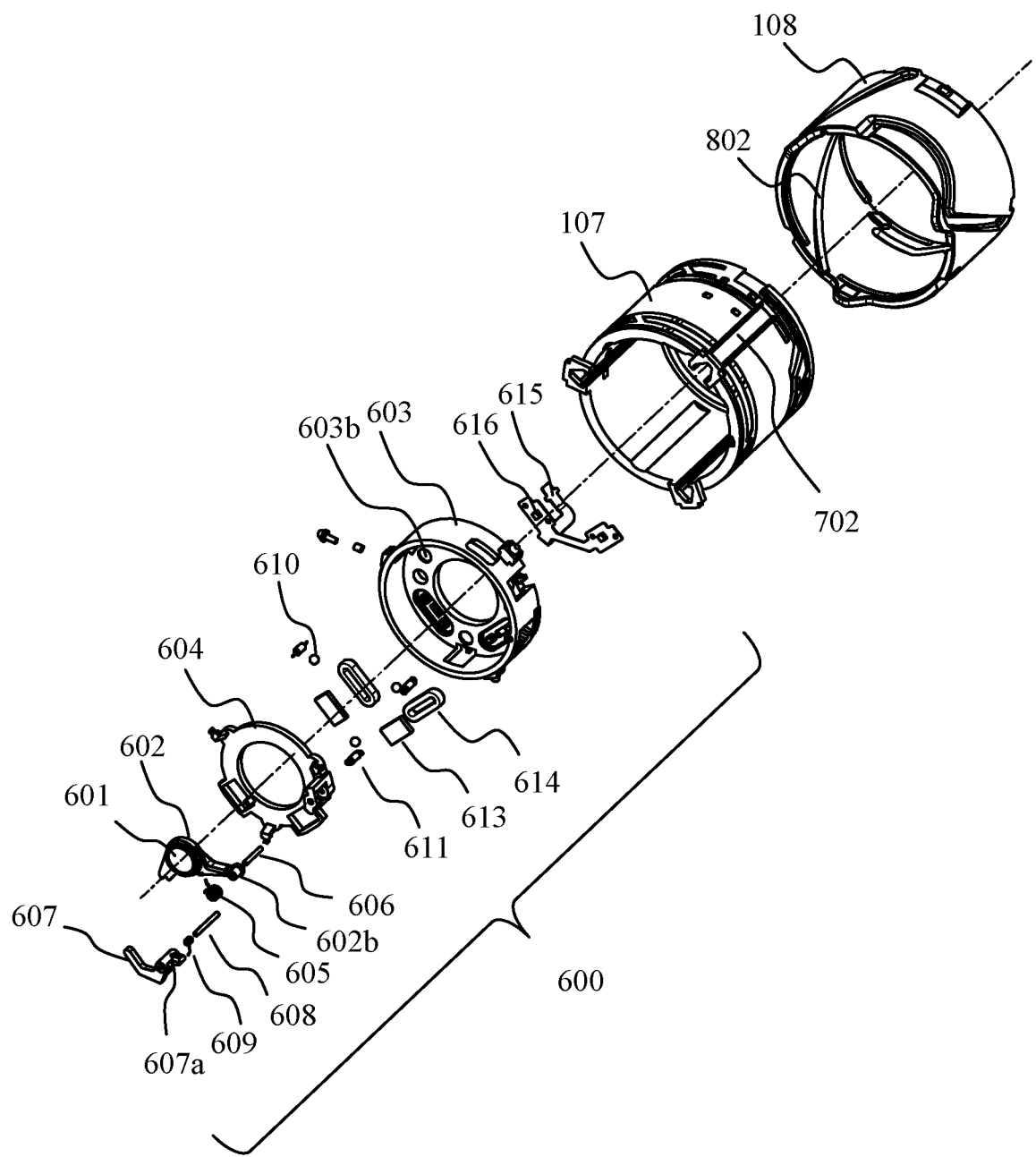
FIG. 4 is an exploded perspective view of a shifting mechanism and a retracting mechanism.
Figure 5A:
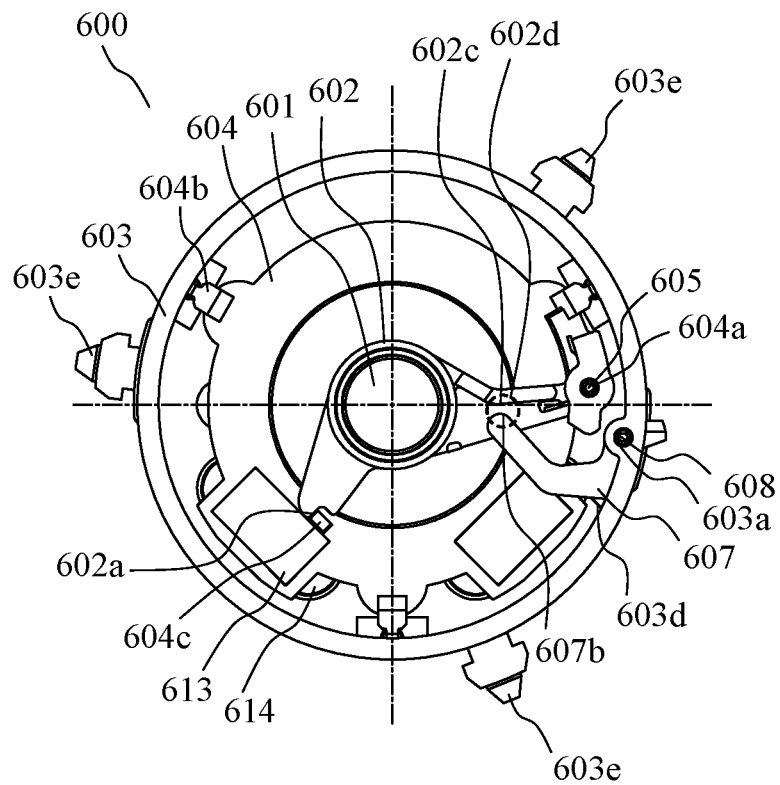
FIGS. 5A and 5B are front views of an image stabilizing apparatus.
Figure 5B:
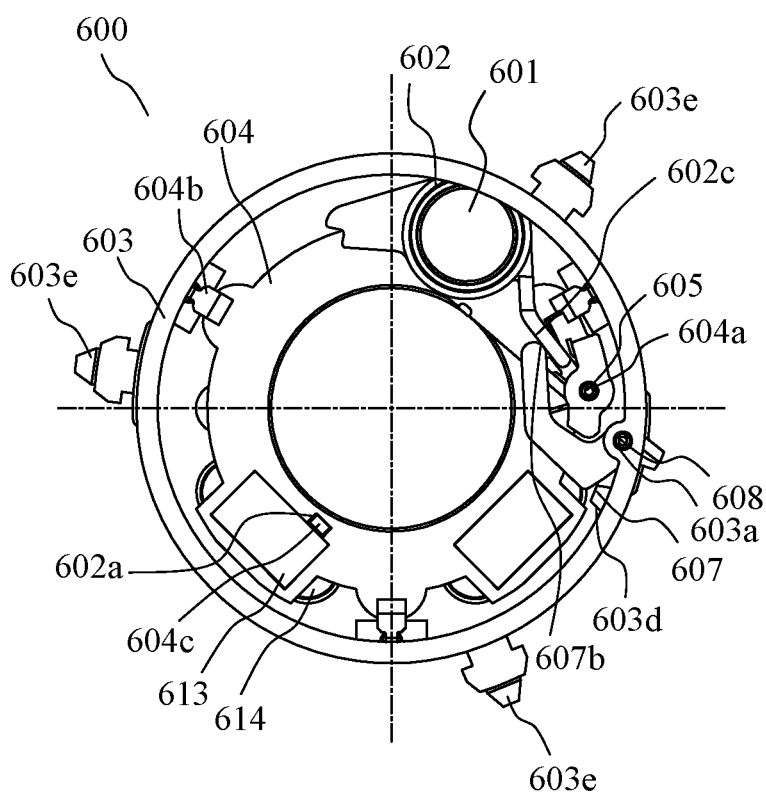

Referring now to FIGS. 4, 5A, and 5B, a description will be given of a structure of an image stabilizing apparatus 600 included in the image stabilizing unit 112 according to this embodiment and having the shifting mechanism. FIG. 4 is an exploded perspective view of the shifting mechanism and the retracting mechanism. FIGS. 5A and 5B are front views of the image stabilizing apparatus 600 in the imaging state in which imaging is enabled and in the retracted state in which imaging is restricted, respectively.

The image stabilizing apparatus 600 includes a shift lens 601, a lens frame (first holder) 602, a base member 603, a shift member 604, a holder torsion spring (biasing portion) 606, a shift lever (driving member) 607, and a lever torsion spring 609 (biasing portion).

The lens frame 602 holds the shift lens 601. The lens frame 602 includes a stopper portion 602a, a sleeve 602b parallel to the optical axis, a first contact surface 602c, and an escape space 602d. The lens frame 602 functions together with the shift lever 607 as a moving unit that moves the shift lens 601 between the imaging position located on the optical axis and the shifted position shifted (retreated) from the optical axis.

The shift member 604 includes bearings 604a that supports a holder shaft 605, three ball receiving surfaces (not illustrated) that contact the three balls 610, and three spring hooks 604b engaged with first ends of three thrust springs 611. The shift member 604 includes a pair of magnets 613 spaced apart from each other by in the circumferential direction in a plane orthogonal to the optical axis, and a contact portion 604c which the stopper portion 602a contacts.

The holder shaft 605 is engaged with the sleeve 602b parallel to the optical axis. The lens frame 602 is rotatably supported by the bearings 604a between the imaging position and the shifted position via the holder shaft 605, and moves integrally with the shift member 604 in a plane orthogonal to the optical axis during image stabilization.

The holder torsion spring 606 includes a torsion spring portion and a compression spring portion, and is engaged with the sleeve 602b. The torsion spring portion of the holder torsion spring 606 biases the lens frame 602 against the shift member 604 so that the stopper portion 602a contacts the contact portion 604c. That is, the torsion spring portion biases the lens frame 602 so as to move it from the shifted position to the imaging position. The compression spring portion of the holder torsion spring 606 biases the lens frame 602 to bring the tip of the sleeve 602b into contact with the bearings 604a.

The base member 603 has ball grooves 603b and three spring hooks engaged with second ends of the three thrust springs 611. Due to the biasing force of the thrust spring 611, each of the three balls 610 is housed rollably within a plane orthogonal to the optical axis while each ball 610 is held between the ball receiving surface of the shift member 604 and the ball groove 603b. The base member 603 includes bearings 603a that support a lever shaft 608 parallel to the optical axis, and an imaging position contact surface 603d which the shift lever 607 contacts. A pair of coils 614 are disposed with the same phase as the pair of magnets 613 on the base member 603. In a case where the pair of coils 614 are energized, a Lorentz force is generated with the magnetism of the pair of magnets 613. Due to the generated Lorentz force, the shift member 604 is supported movably parallel to the base member 603 within a plane orthogonal to the optical axis.

A pair of Hall elements 616 are mounted on a flexible printed circuit (FPC) board 615. The pair of Hall elements 616 are disposed at positions facing the pair of magnets 613 in the optical axis direction and are fixed to the base member 603. The Hall elements 616 detect changes in the directions and magnitudes of the magnetic forces of the pair of magnets 613, and the lens control unit 104 calculates the position of the shift member 604 relative to the Hall elements 616 based on the detection results of the Hall elements 616. At that time, the lens control unit 104 controls the voltage applied to the pair of coils 614 based on image stabilizing information from the gyro sensor (not illustrated) provided to the camera body 1 or the lens barrel 101, and moves the shift member 604 on the plane orthogonal to the optical axis. Thus, by moving the lens frame 602 so as to correct image blur, image blur caused by vibration such as camera shake of the object image on the imaging plane of the image sensor 16 can be corrected, and still and moving images without image blur can be obtained.

The shift lever 607 has an engagement hole 607a engaged with the lever shaft 608, and a contact portion 607b that contacts the first contact surface 602c. The shift lever 607 is rotatably supported by the bearings 603a about the lever shaft 608. The shift lever 607 is biased toward the imaging position by the lever torsion spring 609 attached around the lever shaft 608 so as to contact the imaging position contact surface 603d.

Second followers 603e are provided on the outer circumference of the base member 603 at three locations at approximately equal intervals in the circumferential direction. Each of the three second followers 603e is engaged with a corresponding one of the three second cam grooves 802 formed on the inner circumference of the cam cylinder 108, and is guided by the linear guide groove 702 in the linear guide cylinder 107. Thereby, the base member 603 is supported movably back and forth along the optical axis direction relative to the cam cylinder 108 and the linear guide cylinder 107. The image stabilizing apparatus 600 is supported movably back and forth along the optical axis direction.

Figure 6:
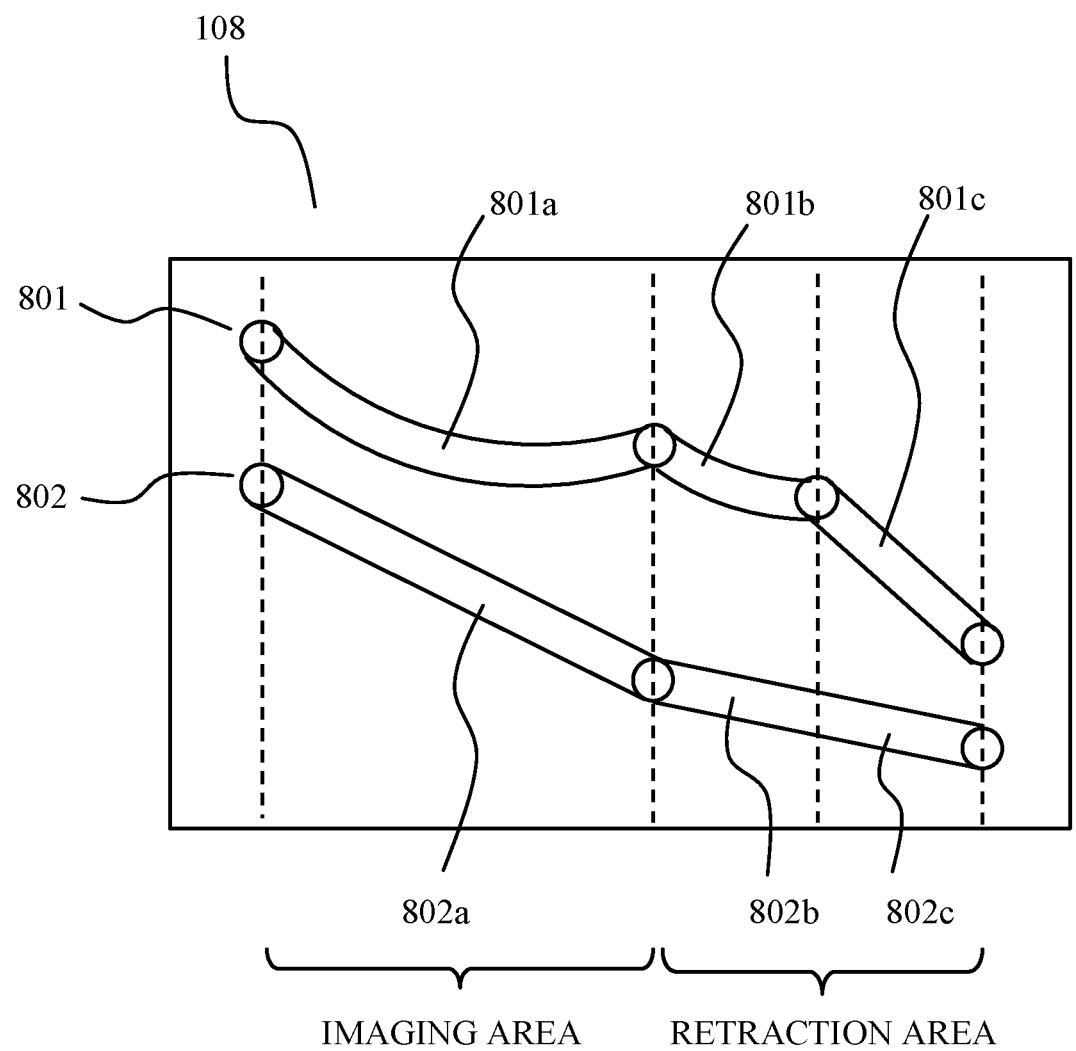
FIG. 6 is a developed view illustrating cam loci of cam grooves formed in a cam cylinder.

FIG. 6 is a developed view illustrating cam loci of the first cam groove 801 and the second cam groove 802 formed in the cam cylinder 108.

As described above, the second followers 603e are engaged with the second cam grooves 802. First followers (not illustrated) are formed on the outer circumferential portion of the lens frame (second holder) 111a that holds the first lens unit 111. The first followers are engaged with the first cam grooves 801 and move back and forth according to the loci of the first cam grooves 801 along the optical axis direction.

The first cam groove 801 has an imaging area 801a from the telephoto end to the wide-angle end and a retraction area (non-imaging area) from the wide-angle end to the retraction end. The retraction area has a first retraction area 801b and a second retraction area 801c. The second cam groove 802 has an imaging area 802a from the telephoto end to the wide-angle end and a retraction area from the wide-angle end to the retraction end. The retraction area has a first retraction area 802b and a second retraction area 802c.

A description will now be given of the operation of the image stabilizing apparatus 600 in a case where the lens barrel 101 transitions from the imaging state to the retracted state.

Figure 7:
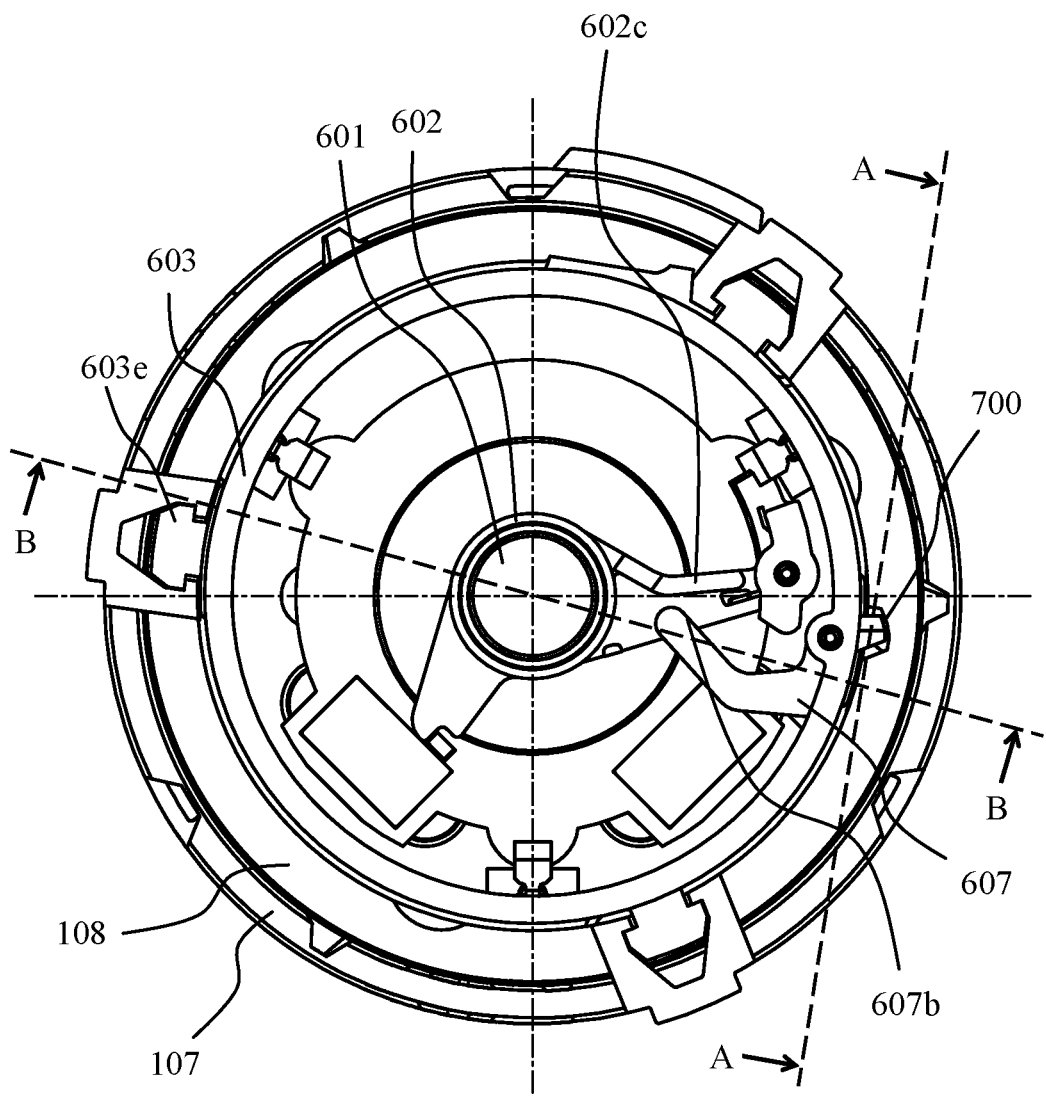
FIG. 7 is a front view of a structure including the image stabilizing apparatus and a linear guide cylinder.
Figure 9:
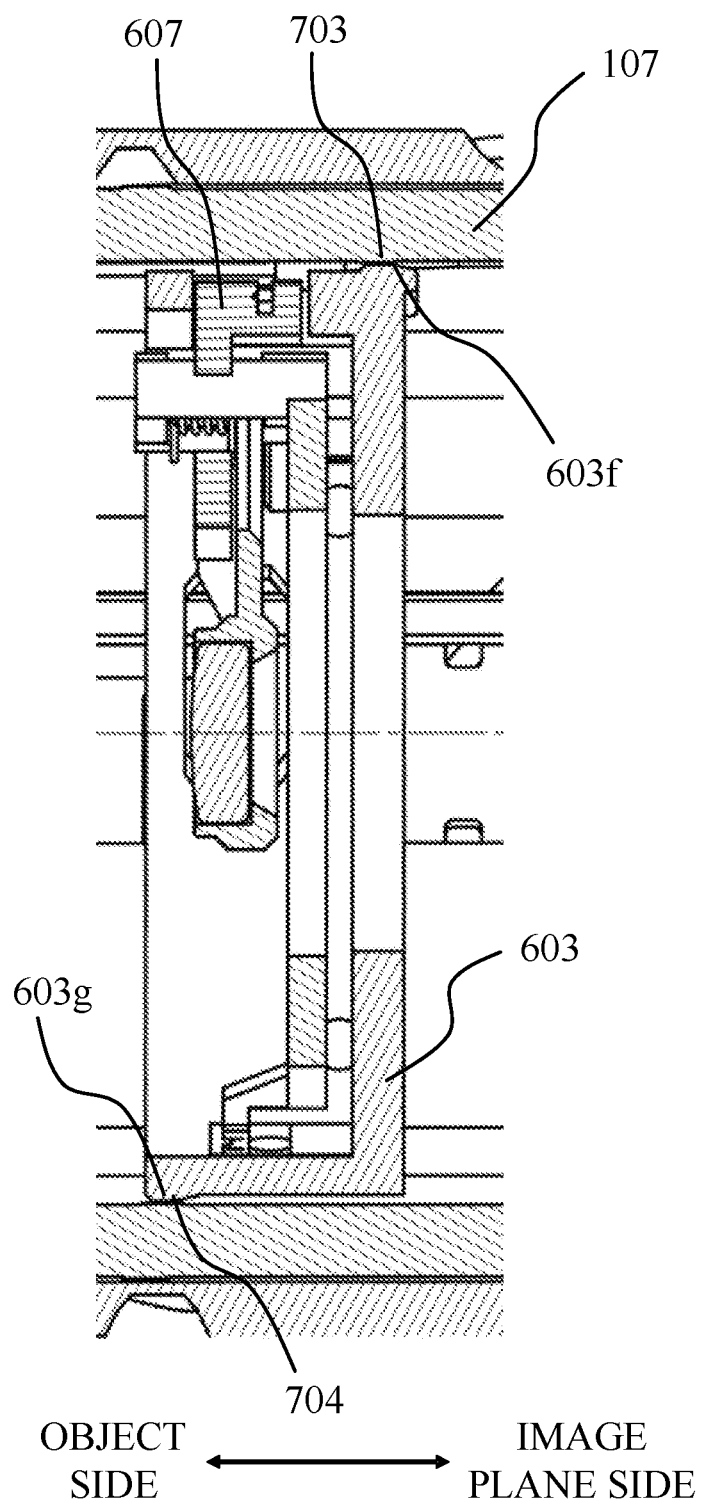
FIG. 9 is a sectional view taken along a line B-B in FIG. 7.
Figure 10A:
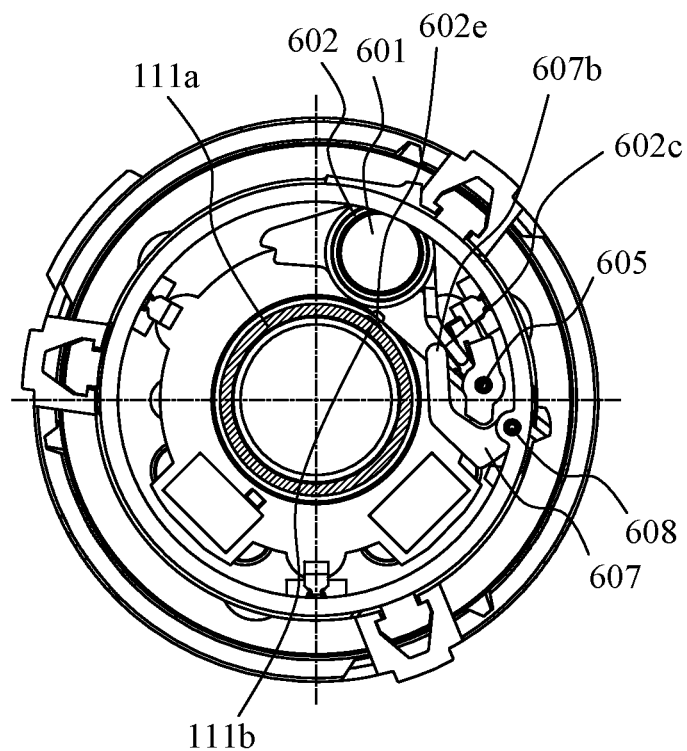
FIGS. 10A and 10B are sectional views of the image stabilizing apparatus.
Figure 10B:
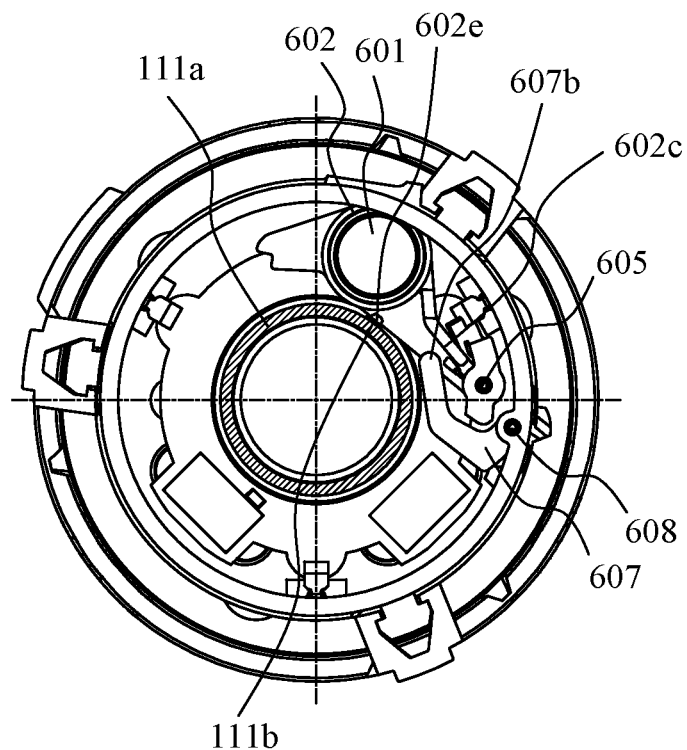
Figure 11:
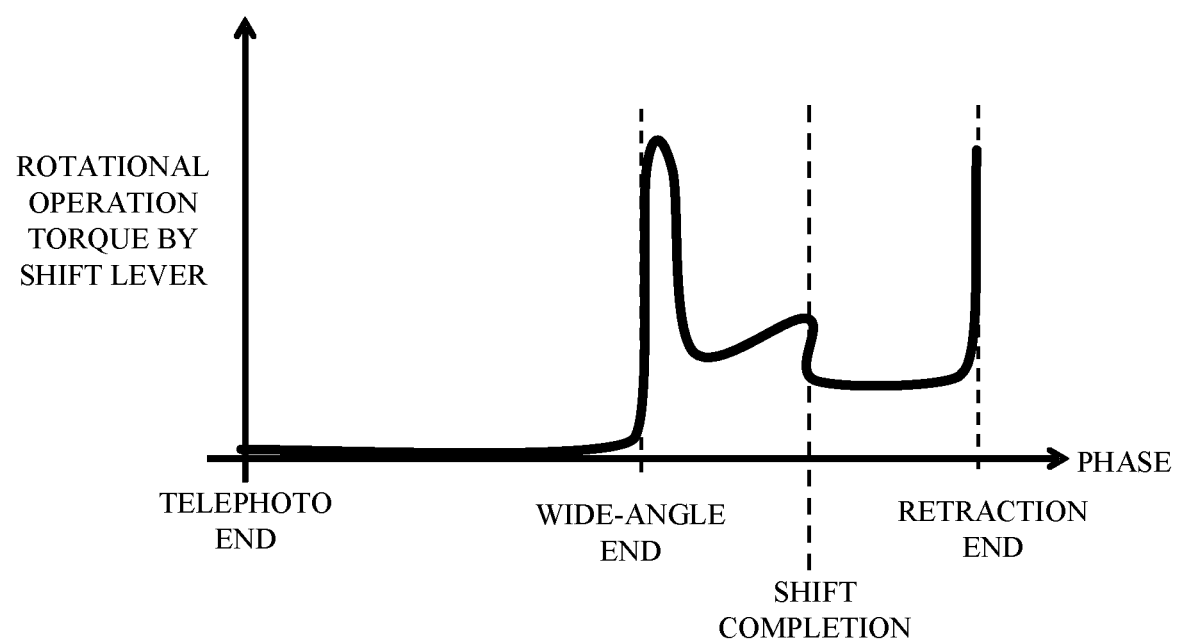
FIG. 11 illustrates a rotational operation torque by a shift lever (withdrawal lever).

FIG. 7 is a front view of a structure including the image stabilizing apparatus 600 and the linear guide cylinder 107. FIGS. 8A to 8E are sectional views taken along a line A-A in FIG. 7, illustrating a relationship between the linear guide cylinder 107 and the shift lever 607. FIG. 8A is a sectional view in a case where the zoom unit 110 is located at a position other than the wide-angle end in the range from the wide-angle end to the telephoto end. FIG. 8B is a sectional view in a case where the zoom unit 110 is located at the wide-angle end. FIGS. 8C and 8D are sectional views in a case where the zoom unit 110 is located between the wide-angle end and the retraction end. FIG. 8E is a sectional view in a case where the zoom unit 110 is located at the retraction end. In FIGS. 8A to 8E, the upper side is the front side (object side). FIG. 9 is a sectional view taken along a line B-B in FIG. 7 in a case where the zoom unit 110 is located at the wide-angle end. FIGS. 10A and 10B are sectional views of the image stabilizing apparatus 600. FIGS. 10A and 10B are sectional views in a case where the lens frame 602 is located at a first shifted position (first withdrawal position) and a second shifted position (second withdrawal position), respectively. FIG. 11 illustrates the rotational operation torque of the shift lever 607.

As illustrated in FIG. 7, the linear guide cylinder 107 has a sliding surface 700 on which the shift lever 607 slides. As illustrated in FIGS. 8A to 8E, the sliding surface 700 includes a first sliding surface 700a, a second sliding surface 700b, a third sliding surface (parallel surface) 700c, and an engagement portion 701. The shift lever 607 includes a first slider 607c, a second slider 607d, a third slider 607e, and an engagement portion 607f.

In the state of FIG. 8A, the shift lens 601 is located on the optical axis. At this time, the first slider 607c, the second slider 607d, and the third slider 607e are disposed at positions that do not contact the sliding surface 700, and the shift lever 607 does not rotate. As illustrated in FIG. 5A, the shift lever 607 is supported so that the contact portion 607b is located in the escape space 602d where the contact portion 607b does not contact the first contact surface 602c. Thereby, the lens frame 602 can move integrally with the shift member 604 in parallel within the plane orthogonal to the optical axis during image stabilization.

In the state of FIG. 8B, the first slider 607c and the first sliding surface 700a contact each other, and the rotation of the zoom operation ring 103 is stopped. A first preceding contact portion 603f is provided on the outer circumferential portion of the base member 603. The first preceding contact portion 603f is disposed in the same phase as the shift lever 607 and on the rear side (imaging plane side) of the second follower 603e. A second preceding contact portion 603g is provided on the outer circumferential portion of the base member 603. The second preceding contact portion 603g is disposed in a phase that faces the shift lever 607 with respect to the optical axis, and at least part of the second preceding contact portion 603g is disposed on the object side of the second follower 603e. The first preceding contact surface 703 and the second preceding contact surface 704 are provided on the inner circumferential surface side of the linear guide cylinder 107. In a case where the second followers 603e are located closest to the wide-angle end of the imaging area 802a, the first preceding contact portion 603f faces the first preceding contact surface 703, and the second preceding contact portion 603g faces the second preceding contact surface 704. Due to the contact between the first slider 607c and the first sliding surface 700a, in a case where a rotational force is generated in the entire base member 603, the displacement in the rotational direction is restricted, and the impact on the second cam groove 802 is reduced.

The shift lever 607 is biased by the lever torsion spring 609 with the lever shaft 608 as a rotation axis. The first slider 607c is biased in the circumferential direction of the linear guide cylinder 107 (arrow C direction in FIGS. 8A to 8E). The first sliding surface 700a is tilted by an angle θ1 relative to the optical axis. In a case where the first slider 607c is pressed against the first sliding surface 700a, the first slider 607c receives a reaction force from the first sliding surface 700a in a direction against the lever torsion spring 609. In a case where the zoom unit 110 moves from the wide-angle end to the retraction end, the reaction force from the first sliding surface 700a increases, and the shift lever 607 starts to rotate about the lever shaft 608 against the biasing force of the lever torsion spring 609. Thereafter, as illustrated in FIG. 8C, the second slider 607d and the second sliding surface 700b contact each other. The second sliding surface 700b is tilted by an angle θ2 smaller than the angle θ1 relative to the optical axis. In a case where the zoom unit 110 is retracted toward the rear side (imaging plane side), the force component in the slope direction (sliding direction) on the second sliding surface 700b is larger than the force component in the slope direction on the first sliding surface 700a. That is, the force necessary to slide the second slider 607d on the second sliding surface 700b may be smaller than the force necessary to slide the first slider 607c on the first sliding surface 700a. Thereby, in a case where the zoom unit 110 moves from the wide-angle end to the retraction end, a click feeling (see FIG. 11) is generated due to the difference in an operating force between a state in which the first slider 607c slides on the first sliding surface 700a and a state in which the second slider 607d slides on the second sliding surface 700b. This embodiment sets the click feeling suitable for operating the zoom operation ring 103 by changing the angle between the first sliding surface 700a and the second sliding surface 700b and the biasing force of the lever torsion spring 609. The set click feeling allows the user to recognize the boundary of the phase of the zoom operation ring 103.

As the second slider 607d slides on the second sliding surface 700b to the rear side (imaging plane side) and the shift lever 607 rotates, the contact portion 607b contacts the first contact surface 602c. As the second slider 607d moves further toward the rear side (imaging plane side), the rotation of the shift lever 607 causes the lens frame 602 to shift from the optical axis against the biasing force of the holder torsion spring 606.

As illustrated in FIG. 8D, in a case where the third slider 607e contacts the third sliding surface 700c, the lens frame 602 is located at the first shifted position in FIG. 10A. The third sliding surface 700c is parallel to the optical axis, and the shift lever 607 does not rotate while the third slider 607e contacts the third sliding surface 700c. The phrase "parallel to the optical axis" includes not only strictly parallel to the optical axis but also substantially parallel (substantially parallel) to the optical axis. The first followers are engaged with the cam grooves in the second retraction area 801c, and the first lens unit 111 approaches the image stabilizing apparatus 600 according to the operation of the zoom operation ring 103 toward the retraction side. Part of the first zoom unit 110 then enters the space created by the retraction of the lens frame 602. Since the lens frame 602 is located at the first shifted position, it does not contact the part of the first lens unit 111 that has entered the space.

As illustrated in FIG. 8E, in a case where the zoom operation ring 103 is operated until the zoom unit 110 reaches the retracted position, the engagement portion 607f slides and is finally engaged with the engagement portion 701. Thereby, the retracted state during non-imaging illustrated in FIG. 5B can be locked. At this time, the lens frame 602 is located at the second shifted position. The engagement portion 701 is formed as a concave shape on the extension of the third sliding surface 700c. In a case where the engagement portion 607f is engaged with the engagement portion 701, the shift lever 607 is rotated toward the imaging position by the biasing force of the lever torsion spring 609. In response, the lens frame 602 also rotates toward the imaging position due to the biasing force of the holder torsion spring 606. That is, the second shifted position is closer to the imaging position (optical axis side) than the first shifted position. In a case where the engagement portion 701 has a convex shape, the lens frame 602 is shifted from the first shifted position toward the outside. In this embodiment, the engagement portion 701 having the concave shape can minimize a shift amount of the lens frame 602 and suppress the size increase of the lens barrel 101. In this embodiment, the second shifted position is a position at which the rotation of the lens frame 602 toward the imaging position is stopped because the second contact surface 602e contacts the lens frame contact portion 111b provided on the lens frame 111a. At this time, the contact portion 607b and the first contact surface 602c are separated. The second contact surface 602e is more distant from the holder shaft 605, which is the rotation center, than the first contact surface 602c. The reaction force applied to the lens frame 602 in the retracted state is smaller than the reaction force applied in a case where the rotation is stopped by the shift lever 607. Thereby, the lens frame 602 is restrained from increasing in size and complicating its shape in order to secure rigidity for creep prevention.

In a case where the lens barrel 101 transitions from the retracted state to the imaging state, the shift lever 607 transitions from the state illustrated in FIG. 8E to the state illustrated in FIG. 8B through the states illustrated in FIGS. 8D and 8C. Changing the angle between the engagement portion 607f and the engagement portion 701 and the biasing force of the lever torsion spring 609 can set unlock torque suitable to operate the zoom operation ring 103.

As described with reference to FIG. 8A, in a case where the lens barrel 101 is in the imaging state, no rotational operation torque is generated from sliding of the shift lever 607. As described with reference to FIG. 8B, the tilt angle of the first sliding surface 700a relative to the optical axis is large and the force component in the slope direction is small, so the rotational operation torque becomes large at the wide-angle end. As described with reference to FIG. 8C, since the tilt angle of the second sliding surface 700b relative to the optical axis is small and the force component in the slope direction is large, the rotational operation torque is small. However, as the retracted state of the lens barrel 101 further changes, the shift lever 607 rotates and the biasing forces of the lever torsion spring 609 and the holder torsion spring 606 increase, so the rotational operation torque gradually increases. At this time, each first follower is engaged with the first retraction area 801b. The first retraction area 801b is formed so that the gradient relative to the optical axis increases toward the retraction side. That is, the rotational operation torque generated from the sliding of the shift lever 607 during the retraction operation decreases toward the retraction side. Thereby, the rotational operation torque can be made closer to a constant value. As described with reference to FIG. 8D, the third sliding surface 700d is formed parallel to the optical axis, and thus the rotational operation torque has a constant value. At this time, each first follower is engaged with the second retraction area 801c. In the second retraction area 801c, the tilt angle of the cam groove is constant, and the rotational operation torque generated from the sliding of the shift lever 607 is also constant. As described with reference to FIG. 8E, in the retracted state, the shift lever 607 is engaged with the engagement portion 701 and restricted from further rotating. At this time, the shift lever 607 is smoothly engaged with the engagement portion 701 because the engagement portion 701 has a concave shape. As described above, the rotational operation torque becomes large only at the wide-angle end during the retraction operation, and thus the user can easily recognize the imaging end and smoothly perform the retraction operation.

In a case where the zoom operation ring 103 is operated so that the lens barrel 101 transitions from the retracted state to the imaging state, a phase that generates a large rotational operation torque is only at the retraction end where the shift lever 607 escapes from the engagement portion 701. In other phases, no large rotational operation torque is generated. The angles θ1 and θ2 and the biasing force of the lever torsion spring 609 are set so that the rotational operation torque becomes smaller while the shift lever 607 transitions from the second sliding surface 700b to the first sliding surface 700a. The user can recognize the boundary between the retraction area and the imaging area because the rotational operation torque is reduced in the imaging area. The user can smoothly operate the zoom operation ring 103 from the retraction area to the imaging area without feeling uncomfortable.

An unillustrated charge member may be used to adjust the rotational operation torque. The charge member is disposed, for example, between the zoom operation ring 103 and an unillustrated fixed cylinder, and changes a charge amount according to the rotational phase of the zoom operation ring 103.

The structure according to this embodiment can realize the lens barrel 101 that includes the lock mechanism for the retracted state and the lens shifting mechanism and can suppress the size increase by sharing components.

While the first slider 607c, the second slider 607d, and the third slider 607e are formed on a plane in this embodiment, they may be formed in a continuous circular arc shape. The third sliding surface 700c may be tilted at an angle θ3 smaller than the angle θ2 relative to the optical axis. The third sliding surface 700c may be omitted, and the second sliding surface 700b may be connected to the engagement portion 701. In the retracted state, the first slider 607c and the engagement portion 607f contact the engagement portion 701, but only the engagement portion 607f contacts the engagement portion 701, another component (such as the zoom operation ring 103 and an unillustrated fixed barrel) may restrict the zoom operation ring 103 from rotating toward the retraction side. The lens frame 602 may not perform image stabilization. That is, the lens frame 602 may be held by the base member 603 via the holder shaft 605. The shift lever 607 may be integrated with the lens frame 602.

The above embodiment can provide a lens barrel that includes the lock mechanism for the retracted state and the lens shifting mechanism and can suppress the size increase. The shifting direction of the lens shifting mechanism is not limited to a direction orthogonal to the optical axis of the optical system.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-084561, filed on May 24, 2022, which is hereby incorporated by reference herein in its entirety.

What is claimed is:

1. A lens barrel configured to transition between an imaging state where imaging is enabled and a retracted state where imaging is restricted, the lens barrel comprising:
   a moving unit configured to move a first optical member included in an optical system between an imaging position located on an optical axis of the optical system and a shifted position shifted from the optical axis;
   a base member configured to movably support the moving unit;
   a cylindrical member disposed on an outer circumference of the base member; and
   an operating member configured, when operated, to cause relative movement between the cylindrical member and the base member,
   wherein the cylindrical member includes a sliding surface on which the moving unit slides and an engagement portion engageable with the moving unit,
   wherein the moving unit slides on the sliding surface and moves the first optical member from the imaging position to the retracted position in a case where the lens barrel transitions from the imaging state to the retracted state, and
   wherein in a case where the lens barrel is in the retracted state, the moving unit is engaged with the engagement portion and restricted from moving.

2. The lens barrel according to claim 1, wherein the moving unit includes a first holder configured to hold the first optical member, and a driving member slidable on the sliding surface to move the first holder.

3. The lens barrel according to claim 1, wherein the engagement portion has a concave shape relative to the sliding surface.

4. The lens barrel according to claim 1, wherein the shifted position includes a first shifted position and a second shifted position located on an optical axis side of the first shifted position, and
   wherein in a case where the lens barrel transitions from the imaging state to the retracted state, the first optical member moves to the first shifted position, and then moves to the second shifted position due to engagement of the moving unit with the engagement portion.

5. The lens barrel according to claim 4, wherein the sliding surface includes a parallel surface parallel to the optical axis, and
   wherein the first optical member is located at the first shifted position while the moving unit slides on the parallel surface.

6. The lens barrel according to claim 4, further comprising a second holder configured to hold a second optical member and enter a space created by movement of the first optical member to the first shifted position.

7. The lens barrel according to claim 6, wherein the moving unit includes a first holder configured to hold the first optical member and a driving member configured to rotate the first holder, and
   wherein in a case where the first optical member is located at the second shifted position, the first holder contacts the second holder.

8. The lens barrel according to claim 6, wherein the moving unit includes a first holder configured to hold the first optical member and a driving member configured to rotate the first holder, and
   wherein the first holder includes a first contact surface that contacts the driving member in a case where the first optical member is located at the first shifted position, and a second contact surface that contacts the second holder in a case where the first optical member is located at the second shifted position, and
   wherein a distance between the second contact surface and a rotation center of the first holder is longer than a distance between the first contact surface and the rotating center of the first holder.

9. The lens barrel according to claim 1, wherein the sliding surface includes a first sliding surface on which the moving unit slides in a case where the lens barrel transitions from the imaging state to the retracted state, and a second sliding surface on which the moving unit slides after the moving unit slides on the first sliding surface, and
   wherein a tilt angle of the first sliding surface relative to the optical axis is larger than a tilt angle of the second sliding surface relative to the optical axis.

10. The lens barrel according to claim 9, further comprising:
    a cam cylinder configured to rotate according to operation on the operating member; and
    a second holder configured to hold a second optical member and enters a space created by movement of the first optical member to the shifted position,
    wherein the cam cylinder includes a cam groove engaged with a follower provided on the second holder, and
    wherein the cam groove includes a cam engaged with the follower while the moving unit slides on the second sliding surface, and configured to increase in a gradient relative to the optical axis as the lens barrel moves to the retracted state.

11. The lens barrel according to claim 9, further comprising a lens unit including the base member,
    wherein the lens unit includes an integrally movable follower and a first preceding contact portion having the same phase as that of the moving unit and provided on an imaging plane side of the follower,
    wherein the cylindrical member includes a first preceding contact surface, and
    wherein in a case where the moving unit contacts the first sliding surface, the first preceding contact portion faces the first preceding contact surface.

12. The lens barrel according to claim 9, further comprising a lens unit including the base member,
    wherein the lens unit includes an integrally movable follower and a second preceding contact portion having a phase facing the moving unit with respect to the optical axis, and at least partially provided on an object side of the follower, and
    wherein the cylindrical member includes a second preceding contact surface, and
    wherein in a case where the moving unit contacts the first sliding surface, the second preceding contact portion faces the second preceding contact surface.

13. The lens barrel according to claim 1, wherein the first optical member is included in an image stabilizing unit configured to correct image blur.

14. The lens barrel according to claim 1, further comprising a biasing portion configured to bias the moving unit toward the imaging position.

15. An image pickup apparatus comprising:
    a lens barrel configured to transition between an imaging state where imaging is enabled and a retracted state where imaging is restricted; and
    an image sensor, wherein the lens barrel includes:
a moving unit configured to move a first optical member included in an optical system between an imaging position located on an optical axis of the optical system and a shifted position shifted from the optical axis;
a base member configured to movably support the moving unit;
a cylindrical member disposed on an outer circumference of the base member; and
an operating member configured, when operated, to cause relative movement between the cylindrical member and the base member,
wherein the cylindrical member includes a sliding surface on which the moving unit slides and an engagement portion engageable with the moving unit,
wherein the moving unit slides on the sliding surface and moves the first optical member from the imaging position to the retracted position in a case where the lens barrel transitions from the imaging state to the retracted state, and
wherein in a case where the lens barrel is in the retracted state, the moving unit is engaged with the engagement portion and restricted from moving.

* * * * *